(12) United States Patent
Jeon et al.

(10) Patent No.: US 10,180,518 B2
(45) Date of Patent: Jan. 15, 2019

(54) OPTICAL FILM

(71) Applicant: LG CHEM, LTD., Seoul (KR)

(72) Inventors: Byoung Kun Jeon, Daejeon (KR); Su Young Ryu, Daejeon (KR); Moon Soo Park, Daejeon (KR); Hyuk Yoon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 707 days.

(21) Appl. No.: 14/441,318

(22) PCT Filed: Nov. 25, 2013

(86) PCT No.: PCT/KR2013/010741
§ 371 (c)(1),
(2) Date: May 7, 2015

(87) PCT Pub. No.: WO2014/081260
PCT Pub. Date: May 30, 2014

(65) Prior Publication Data
US 2015/0293286 A1 Oct. 15, 2015

(30) Foreign Application Priority Data

Nov. 23, 2012 (KR) .................. 10-2012-0133865
Nov. 25, 2013 (KR) .................. 10-2013-0143813

(51) Int. Cl.
*G02B 5/30* (2006.01)
*G02F 1/13363* (2006.01)
*G02F 1/1335* (2006.01)

(52) U.S. Cl.
CPC ......... *G02B 5/3016* (2013.01); *G02B 5/3041* (2013.01); *G02B 5/3083* (2013.01);
(Continued)

(58) Field of Classification Search
CPC ...... G02B 5/30; G02B 5/3016; G02B 5/3041; G02B 5/3083; G02B 5/305; G02B 5/3025;
(Continued)

(56) References Cited

U.S. PATENT DOCUMENTS 6,400,433 B1   6/2002   Arakawa et al.
7,999,893 B2 *  8/2011   Sakai ............... G02B 5/3016
                                                 349/117

(Continued)

FOREIGN PATENT DOCUMENTS

JP     8-321381 A      12/1996
JP     2004-325971 A   11/2004
(Continued)

*Primary Examiner* — Jie Lei
(74) *Attorney, Agent, or Firm* — Dentons US LLP

(57) ABSTRACT

The present invention relates to an optical film, a polarizing plate including the same, and a display device. The exemplary optical film may have a desired wavelength dispersion characteristic using positive and negative uniaxial retardation films satisfying a predetermined condition. In addition, the optical film has a desired wavelength dispersion characteristic, and thus may be utilized in various fields requiring delicate control of optical properties. For example, the optical film can be useful in the polarizing plate used to prevent reflection and ensure visibility in the display device.

13 Claims, 6 Drawing Sheets

(52) U.S. Cl.
CPC .............. *G02F 1/13363* (2013.01); *G02F 2001/133637* (2013.01); *G02F 2001/133638* (2013.01); *G02F 2413/02* (2013.01)

(58) Field of Classification Search
CPC . G02B 27/283; G02F 1/13363; G02F 1/1335; G02F 1/133528; G02F 1/13471; G02F 1/133634; G02F 2001/133638; G02F 2001/133637; G02F 2413/02
USPC .......... 359/489.07, 489.05, 489.06, 489.03, 359/189.11, 489.12, 489.15, 489.16; 349/75, 117, 118, 119
See application file for complete search history.

(56) References Cited

U.S. PATENT DOCUMENTS

2008/0036954 A1\* 2/2008 Takahashi ......... G02F 1/133634
349/117
2009/0096970 A1 4/2009 Sakai et al.

FOREIGN PATENT DOCUMENTS

| | | |
|---|---|---|
| JP | 2006-058540 A | 3/2006 |
| JP | 2006-208604 A | 7/2006 |
| KR | 10-2007-0088292 A | 8/2007 |
| KR | 10-2010-0031690 A | 3/2010 |
| WO | 2008/001582 A1 | 1/2008 |

\* cited by examiner

OPTICAL FILM

CROSS-REFERENCE TO RELATED APPLICATION

This application is a National Stage Entry of International Application No. PCT/KR2013/010741, filed Nov. 25, 2013, and claims the benefit of Korean Application No. 10-2012-0133865, filed on Nov. 23, 2012, and Korean Application No. 10-2013-0143813, filed Nov. 25, 2013, all of which are hereby incorporated by reference in their entirety for all purposes as if fully set forth herein.

BACKGROUND

1. Field of the Invention

The present invention relates to an optical film, a polarizing plate including the same, and a display device.

2. Discussion of Related Art

A retardation film may be disposed at one or both sides of a liquid crystal cell to enhance a characteristic of a viewing angle of a liquid crystal display (LCD) as disclosed in Japanese Patent Publication No. 1996-321381. The retardation film may also be used to prevent reflection and ensure visibility in a reflective LCD or organic light emitting device (OLED).

The retardation film is a ½ or ¼ wavelength retardation film depending on retardation characteristics. The ½ or ¼ wavelength retardation films have been known so far to exhibit retardation differences according to wavelengths, and therefore are operated in a limited range of wavelengths. For example, in many cases, a film serving as a ¼ wavelength retardation film with respect to light having a wavelength of 550 nm may not be operated with respect to light having a wavelength of 450 or 650 nm.

SUMMARY OF THE INVENTION

The present invention is directed to providing an optical film, a polarizing plate including the same, and a display device.

One aspect of the present invention provides an optical film including a positive uniaxial retardation film and a negative uniaxial retardation film, which are stacked. FIG. 1 is a view of an exemplary optical film 1, in which a positive uniaxial retardation film 101 and a negative uniaxial retardation film 102 are stacked.

A retardation film 100, as shown in FIG. 2, may have refractive indexes ($n_x$, $n_y$, and $n_z$) in directions of x, y, and z axes. Here, the x axis may refer to, for example, any one in-plane direction of the film, the y axis may refer to an in-plane direction perpendicular to the x axis, and the z axis may refer to a direction of a normal line of a planar surface formed by the x and y axes, for example, a thickness direction of the film. In one example, the x axis may direct to a direction parallel to a slow axis of the film, and the y axis may direct to a direction parallel to a fast axis of the film.

The term "uniaxial retardation film" used herein may refer to a retardation film of which a refractive index in any one direction among $n_x$, $n_y$, and $n_z$ is different from refractive indices in the other two directions. The exemplary uniaxial retardation film may be a retardation film satisfying conditions of General Formula 1.

$$n_x \neq n_y \approx n_z \qquad \text{[General Formula 1]}$$

In General Formula 1, the reference mark "≈" means that values at both sides are substantially equal to each other, and the "substantially equal" considers an error within ±5, ±3, ±1, or ±0.5.

The uniaxial retardation film satisfying the conditions of General Formula 1 has in-plane retardation. The value of the in-plane retardation may be, for example, defined by General Formula 2.

$$R_{in} = d \times (n_e - n_o) \qquad \text{[General Formula 2]}$$

In General Formula 2, $R_{in}$ is a value of in-plane retardation, d is a thickness of the retardation film, $n_e$ is an extraordinary refractive index, and $n_o$ is an ordinary refractive index. Here, the extraordinary refractive index may be a refractive index in any one direction, which is different from refractive indices in the other two directions among the refractive indexes in three directions described above and ordinary refractive indexes may be refractive indexes in two directions which are the same as each other. In one example, the extraordinary refractive index may refer to a refractive index in an x axis direction, and the ordinary refractive index may refer to a refractive index in a y direction.

In one example, the positive uniaxial retardation film is a film having a positive in-plane retardation value ($R_{in}$) of General Formula 2, and the negative uniaxial retardation film may be a film having a negative in-plane retardation value ($R_{in}$) of General Formula 2. The positive uniaxial retardation film may be called, for example, a +A retardation film, and the negative uniaxial retardation film may be called, for example, a −A retardation film.

In one example, the optical film includes a variety of combinations of the positive uniaxial retardation film and the negative uniaxial retardation film, and thus exhibits a desired wavelength dispersion characteristic.

Here, the wavelength dispersion characteristic is classified as a normal wavelength dispersion characteristic satisfying the relationship of General Formula 3, a flat wavelength dispersion characteristic satisfying the relationship of General Formula 4, or a reverse wavelength dispersion characteristic satisfying the relationship of General Formula 5.

$$R(450)/R(550) > R(650)/R(550) \qquad \text{[General Formula 3]}$$

$$R(450)/R(550) \approx R(650)/R(550) \qquad \text{[General Formula 4]}$$

$$R(450)/R(550) < R(650)/R(550) \qquad \text{[General Formula 5]}$$

In General Formulas 3, 4, and 5, R(450) is retardation value of a corresponding retardation film with respect to light having a wavelength of 450 nm, R(550) is retardation value of the corresponding retardation film with respect to light having a wavelength of 550 nm, and R(650) is retardation value of the corresponding retardation film with respect to light having a wavelength of 650 nm. The retardation may be in-plane retardation calculated by, for example, General Formula 2.

Referring to FIG. 3, a normal wavelength dispersion characteristic, a flat wavelength dispersion characteristic, and a reverse wavelength dispersion characteristic will be explained. FIG. 3 shows a variation of R(λ)/R(550) values according to a wavelength of one exemplary retardation film. Referring to FIG. 3, it is seen that in case of the retardation film having a normal wavelength dispersion characteristic represented as N, the higher the wavelength of light is, the lower the retardation value is. In case of the retardation film having a reverse wavelength dispersion characteristic represented as R, the higher the wavelength of light is, the higher the retardation value is. However, in case of the retardation film having a flat wavelength dispersion characteristic represented as F, it is seen that there is almost no change in retardation value according to a change in wavelength.

In one example, the optical film may be disposed such that an optical axis of the positive uniaxial retardation film is parallel to an optical axis of the negative uniaxial retardation film at an angle of, for example, −5 to 5, −3 to 3, or −1 to 1 degree.

The term "optical axis" used herein may refer to a slow axis or a fast axis, and unless particularly defined otherwise, may refer to a slow axis. In addition, the term "vertical," "horizontal," "perpendicular," or "parallel" may refer to substantially vertical, horizontal, perpendicular, or parallel without diminishing a desired effect. Each term considers, for example, production errors or variations. Accordingly, for example, each term may include an error within approximately ±15, ±10, ±5, or ±3 degrees.

An optical film in which optical axes of positive uniaxial retardation film and negative uniaxial retardation films are disposed parallel to each other will be described with reference to FIG. 4. That is, as shown in FIG. 4, the positive uniaxial retardation film 101 and the negative uniaxial retardation film 102 may be disposed, for example, upward and downward in a state that their optical axes (↕) are placed in the same direction, and stacked in a state in which such arrangement is maintained, thereby manufacturing an optical film.

In one example, for the optical film including the positive uniaxial retardation film and negative uniaxial retardation films whose axes are disposed parallel to each other, a retardation value may be expected through General Formula 6.

$$R(\lambda) = R_1(\lambda) + R_2(\lambda) \quad \text{[General Formula 6]}$$

In General Formula 6, $R(\lambda)$ is a retardation value of the optical film at a wavelength of $\lambda$ nm, $R_1(\lambda)$ is a retardation value of any one of the positive retardation film and negative uniaxial retardation films at a wavelength of $\lambda$ nm, and $R_2(\lambda)$ is a retardation value of the other one of the positive retardation film and negative uniaxial retardation films at a wavelength of $\lambda$ nm. Thus, when the optical axes of the positive uniaxial retardation and negative uniaxial retardation films are disposed to be parallel to each other, it is easier to control a wavelength dispersion characteristic of the optical film.

In one example, in-plane retardations of the uniaxial retardation films may, for example, satisfy Formulas 1 to 3.

$$|R_1(\lambda)| > |R_2(\lambda)| \quad \text{[Formula 1]}$$

$$R_1(450)/R_1(550) < R_2(450)/R_2(550) \quad \text{[Formula 2]}$$

$$|R(450)| < |R(650)| \quad \text{[Formula 3]}$$

In Formula 1, $|R_1(\lambda)|$ is an absolute value of an in-plane retardation of any one (hereinafter, a first film) of positive and negative uniaxial films with respect to light with a wavelength of $\lambda$ nm, $|R_2(\lambda)|$ is an absolute value of an in-plane retardation of the other one (hereinafter, a second film) of positive and negative uniaxial films with respect to light with a wavelength of $\lambda$ nm, and the wavelength of $\lambda$ nm may be a wavelength of, for example, 450, 550, or 650 nm. In addition, the reference mark "$R_1(\lambda)$" refers to a value of retardation of the first film with respect to light with a wavelength of $\lambda$ nm, and the reference mark "$R_2(\lambda)$" refers to a value of retardation of the second film with respect to light with a wavelength of $\lambda$ nm. That is, in Formula 2, $R_1(450)$ and $R_1(550)$ are in-plane retardation values of the first film with respect to light with wavelengths of 450 and 550 nm, respectively, and $R_2(450)$ and $R_2(550)$ are in-plane retardation values of the second film with respect to light with wavelengths of 450 and 550 nm. In Formula 3, $|R(450)|$ may refer to an absolute value of the sum of $R_1(450)$ and $R_2(450)$, and $|R(650)|$ may refer to an absolute value of the sum of $R_1(650)$ and $R_2(650)$.

The uniaxial retardation films satisfying Formulas 1 to 3 represent that a ratio of an in-plane retardation value with respect to light at 450 nm to an in-plane retardation value with respect to light at 550 nm in a retardation film having higher absolute value of the in-plane retardation with respect to light with at least one of the wavelengths of 450, 550, and 650 nm, and preferably, lights with all ranges of wavelengths, is smaller than that of another retardation film, and also an absolute value of the sum of in-plane retardations of the positive and negative uniaxial retardation films with respect to light with a wavelength of 450 nm, is smaller than that of an in-plane retardation thereof with respect to light with a wavelength of 650 nm.

When an optical film is formed by stacking the positive and negative uniaxial retardation films satisfying Formulas 1 and 2, the optical film overall having a reverse wavelength dispersion characteristic, for example, an optical film satisfying Formula 3, may be formed.

That is, when the positive and negative retardation films of the optical film are stacked such that $R(450)/R(550)$ of one having a higher absolute value of in-plane retardation as shown in Formula 1 is smaller than $R(450)/R(550)$ of one having a smaller absolute value of in-plane retardation as shown in Formula 2, the optical film satisfying Formula 3 can be provided.

The optical film can, as defined in Formula 3, have $|R(650)|$ higher than $|R(450)|$. In one example, a value of in-plane retardation of the optical film may satisfy Formula 4 or 5.

$$0.81 \leq R(450)/R(550) \leq 0.99 \quad \text{[Formula 4]}$$

$$1.01 \leq R(650)/R(550) \leq 1.19 \quad \text{[Formula 5]}$$

In Formula 4, $R(450)$ is the sum of $R_1(450)$ and $R_2(450)$, and $R(550)$ is the sum of $R_1(550)$ and $R_2(550)$, and in Formula 5, $R(550)$ is the sum of $R_1(550)$ and $R_2(550)$, $R(650)$ is the sum of $R_1(650)$ and $R_2(650)$, the $R_1(450)$, $R_1(550)$, and $R_1(650)$ are in-plane retardation values of one of the positive and negative uniaxial films, which has higher absolute value of in-plane retardation, with respect to light with wavelengths of 450, 550, and 650 nm, respectively, and the $R_2(450)$, $R_2(550)$, and $R_2(650)$ may refer to in-plane retardation values of one of the positive and negative uniaxial films, which has lower absolute value of in-plane retardation, with respect to light with a wavelength of 650 nm.

In one example, the optical film may be, as shown in Formula 4 or 5, a film having $R(650)/R(550)$ higher than $R(450)/R(550)$. For example, the $R(450)/R(550)$ of the optical film may be 0.81 to 0.99, 0.82 to 0.98, 0.83 to 0.97, 0.84 to 0.96, 0.85 to 0.95, 0.86 to 0.94, 0.87 to 0.93, 0.88 to 0.92, or 0.89 to 0.91, and the $R(650)/R(550)$ may have a value higher than the $R(450)/R(550)$ and may be 1.01 to 1.19, 1.02 to 1.18, 1.03 to 1.17, 1.04 to 1.16, 1.05 to 1.15, 1.06 to 1.14, 1.07 to 1.13, 1.08 to 1.12, or 1.09 to 1.11.

To provide the optical film satisfying Formula 3, a variety of positive and negative uniaxial retardation films satisfying Formulas 1 and 2 may be combined. For example, uniaxial retardation films having various wavelength dispersion characteristics may be combined.

In one example, when the positive uniaxial retardation film has a normal wavelength dispersion characteristic, the negative uniaxial retardation film may have any one of the normal, flat, and reverse wavelength dispersion characteristics. Specifically, retardation value of the negative uniaxial retardation film having a normal wavelength dispersion characteristic is not particularly limited. However, in the case of the negative uniaxial retardation film having a flat or reverse wavelength dispersion characteristic, the negative uniaxial retardation film may have a higher absolute value of retardation than that of the positive uniaxial retardation film having the normal wavelength dispersion characteristic. Such retardation films satisfy Formulas 1 and 2, and thus an optical film having Formula 3 may be provided.

In one example, when the positive uniaxial retardation film has a flat wavelength dispersion characteristic, the negative uniaxial retardation film may have a normal or reverse wavelength dispersion characteristic. Specifically, in case of the negative uniaxial retardation film having a normal wavelength dispersion characteristic, the negative uniaxial retardation film may have a lower absolute value of retardation than that of the positive uniaxial retardation film having the flat wavelength dispersion characteristic. In addition, the negative uniaxial retardation film having a reverse wavelength dispersion characteristic may have a higher absolute value of retardation than that of the positive uniaxial retardation film having the flat wavelength dispersion characteristic. Such retardation films satisfy Formulas 1 and 2, and thus an optical film satisfying Formula 3 may be provided.

In one example, when a positive uniaxial retardation film has a reverse wavelength dispersion characteristic, a negative uniaxial retardation film may have any one of normal, flat, and reverse wavelength dispersion characteristics. Specifically, a negative uniaxial retardation film having a normal or flat wavelength dispersion characteristic may have a lower absolute value of the retardation than that of the positive uniaxial retardation film having a reverse wavelength dispersion characteristic. Such retardation films may satisfy Formulas 1 and 2, and thus an optical film satisfying Formula 3 may be constituted. However, retardation value of the negative uniaxial retardation film having a reverse wavelength dispersion characteristic is not particularly limited.

In one example, an optical film may include positive and negative uniaxial retardation films, or may serve as a positive or negative uniaxial retardation film by itself. Accordingly, the optical film may have a positive or negative value as, for example, an in-plane retardation value of General Formula 2.

In one example, an optical film may have a ¼ wavelength retardation characteristic. The term "n wavelength retardation characteristic" may refer to a characteristic capable of delaying incident light n times of a wavelength thereof within a range of at least a part of wavelengths. Specifically, in consideration of a wavelength dispersion characteristic of the optical film, a λ/4 retardation value, for example, R(550) of Formula 3, may be 110 to 220, 120 to 170, 130 to 150, −110 to −220, −120 to −170, or −130 to −150 nm.

As the positive uniaxial retardation film used in the optical film, any one used in the art may be used without limitation. For example, the positive uniaxial retardation film may be a liquid crystal film including a stick-type liquid crystal compound or an optical anisotropic polymer film.

The liquid crystal film may include, for example, stick-type liquid crystal compounds, which are polymerized in a horizontally aligned state. The term "horizontally aligned" used herein may refer that an optical axis of a liquid crystal film including a liquid crystal compound has a tilt angle of approximately 0 to 25, 0 to 15, 0 to 10, 0 to 5, or 0 degrees.

In one example, a liquid crystal film may be formed by aligning a polymerizable liquid crystal compound showing a nematic liquid crystal phase, and polymerizing the aligned polymerizable liquid crystal compound. Here, a method of aligning the polymerizable liquid crystal compound may be, for example, a light aligning method or a rubbing aligning method, which is used in the art.

The optical anisotropic polymer film may be, for example, a film formed by extending a light transmitting polymer film capable of providing optical anisotropy by a suitable method. In addition, a non-extended polymer film may also be used as the polymer film as long as it has optical anisotropy. In one example, as the polymer film, a film which has a light transmittance of 70, 80, or 85% or more, and is formed by an absorbent casting method may be used. The polymer film may have a thickness of approximately 3 mm or less, 1 μm to 1 mm, or 5 to 500 μm, considering probability of generating a uniform extended film.

For example, the polymer film may be a polyolefin film such as a polyethylene film or polypropylene film, a cycloolefin polymer (COP) film such as a polynorbornene film, a polyvinylchloride film, a polyacrylonitrile film, a polysulfone film, a polyacrylate film, a poly(vinyl alcohol) (PVA) film, or a cellulose ester-based polymer film such as a triacetyl cellulose (TAC) film, or a copolymer film of cyclic olefin copolymer (COC), polycarbonate (PC), and a copolymer film formed by at least two of the monomers forming the polymer. In one example, as the polymer film, a COP film may be used. Here, as a COP, a ring-opening polymer or hydrogenated product of cycloolefin such as norbornene, an addition-polymer of cycloolefin, a copolymer of cycloolefin and another comonomer such as alpha-olefin, or a graft polymer formed by modifying the polymer or copolymer with an unsaturated carboxylic acid or a derivative thereof may be used, but the present invention is not limited thereto.

The positive uniaxial retardation film included in the optical film may have, for example, a ½ or ¼ wavelength retardation characteristic, and when the positive uniaxial retardation film has a ½ wavelength retardation characteristic, an in-plane retardation with respect to light with a wavelength of 550 nm may be 200 to 290 nm or 220 to 270 nm. When the positive uniaxial retardation film has a ¼ wavelength retardation characteristic, in-plane retardation with respect to light with a wavelength of 550 nm may be 95 to 145 nm or 105 to 120 nm.

In addition, the positive uniaxial retardation film may have, for example, a thickness of approximately 1 mm or less, 1 to 500 μm, or 5 to 300 μm, but the thickness may be changed according to a purpose.

As the negative uniaxial retardation film used in the optical film, any one used in the art may be used without limitation. For example, the negative uniaxial retardation film may be a liquid crystal film including a discotic or a cholesteric liquid crystal compound, or an optical anisotropic polymer film.

The liquid crystal film may include, for example, a discotic or a cholesteric liquid crystal compound, which is polarized in a horizontally aligned state.

In one example, the liquid crystal film may be formed by aligning a polymerizable liquid crystal compound showing a discotic liquid crystal phase or a polymerizable liquid crystal compound showing a cholesteric liquid crystal phase and polymerizing the above aligned liquid crystal compound. The polymerizable liquid crystal compound may be aligned by the above-described method.

The optical anisotropic polymer film used as a negative uniaxial retardation film may provide optical anisotropy, for example, by the same method as described in the optical anisotropic polymer film used as a positive uniaxial retardation film. In addition, the optical anisotropic polymer film used as a negative uniaxial retardation film may have light transmittance and a thickness which an optical anisotropic polymer film used in the above-described positive uniaxial retardation film has. As an example of the polymer film capable of being used as such a negative uniaxial retardation film, polystilene may be used, and such a polymer film may be used by being uniaxially extended.

The negative uniaxial retardation film included in the optical film along with the positive uniaxial retardation film may have, for example, a ½ or ¼ wavelength retardation characteristic. When the negative uniaxial retardation film has a ½ wavelength retardation characteristic, an in-plane retardation value with respect to light with a wavelength of 550 nm may be −200 to −290 nm or −220 to −270 nm. When the negative uniaxial retardation film has a ¼ wavelength retardation characteristic, an in-plane retardation value with respect to light with a wavelength of 550 nm may be −95 to −145 nm or −105 to −120 nm.

In one example, in the optical film, when the positive uniaxial retardation film has a ½ wavelength retardation characteristic, the negative uniaxial retardation film may have a ¼ wavelength retardation characteristic, and when the positive uniaxial retardation film has a ¼ wavelength retardation characteristic, the negative uniaxial retardation film may have a ½ wavelength retardation characteristic.

The negative uniaxial retardation film may have a thickness of, for example, approximately 1 mm or less, 1 to 5 μm, or 5 to 300 μm, but is not particularly limited thereto.

The positive and negative uniaxial retardation films may be attached to each other, for example, by a suitable pressure-sensitive adhesive or adhesive, thereby forming an optical film.

In one example, the optical film may further include an arbitrary film capable of being used in the art, in addition to the positive and negative uniaxial retardation films.

Another aspect of the present invention relates to a polarizing plate. The exemplary polarizing plate may include a linear polarizer, and the optical film formed on one surface of the linear polarizer. That is, the polarizing plate may include a linear polarizer; and a positive uniaxial retardation film and a negative uniaxial retardation film, which are stacked on one surface of the linear polarizer. Here, the above-described contents may also be applied to details on the optical film, and the positive and negative uniaxial retardation films. In one example, the polarizing plate may be formed by attaching the positive uniaxial retardation film of the optical film to one surface of the linear polarizer. In such a case, the polarizing plate may include a linear polarizer, the positive uniaxial retardation film, and the negative uniaxial retardation film, which are sequentially disposed. FIG. 5 shows an example of a polarizing plate 2 including a linear polarizer 201, a positive uniaxial retardation film 101, and a negative uniaxial retardation film 102, which are sequentially disposed.

In one example, an optical axis of the positive uniaxial retardation film may be disposed parallel to have an angle of, for example, −5 to 5, −3 to 3, or −1 to 1 degree with an optical axis of the negative uniaxial retardation film. In addition, a light absorbing axis of the linear polarizer may be disposed to have an angle of 0 to 90, 5 to 85, 10 to 80, 15 to 75, 20 to 70, 25 to 65, 30 to 60, 35 to 55, 40 to 50, or approximately 45 degrees with the optical axis of the positive uniaxial retardation film.

In one example, FIG. 6 shows that optical axes (↕) of the positive uniaxial retardation film 101 and the negative uniaxial retardation film 102 are tilted at approximately 45 degrees based on a light absorbing axis of a linear polarizer drawn by a dotted line (- - -). In one example, as shown in FIG. 4, when the optical film has a structure in which the optical axes of the positive uniaxial retardation film 101 and the negative uniaxial retardation film 102 are stacked parallel to each other, a direction of the optical axis of the optical film may be the same as those of the optical axes of the positive and negative uniaxial retardation films 101 and 102. Accordingly, in one example, the optical film whose optical axis is controlled at a predetermined angle may be obtained by stacking the positive and negative uniaxial retardation films tilted at a predetermined angle for their optical axes to be aligned in the same direction.

Here, the linear polarizer is a functional element capable of extracting light vibrating in one direction from incident lights vibrating in various directions. As the linear polarizer, for example, a conventional linear polarizer such as a poly(vinyl alcohol) (PVA) linear polarizer may be used. In one example, the linear polarizer may be a PVA film or sheet on which a dichroic pigment or iodine is adsorbed and aligned. The PVA may be obtained by gelating poly(vinyl acetate). As the polyvinyl acetate, a homopolymer of vinyl acetate (VA); or a copolymer of VA and another monomer may be used. Here, as the monomer copolymerized with VA, one or at least two of an unsaturated carboxylic acid compound, an olefin compound, a vinyl ether compound, an unsaturated sulfonic acid compound, and an acrylamide compound having an ammonium group. A gelation degree of polyvinyl acetate may be, generally, approximately 85 to 100 mol % or 98 to 100 mol %. In addition, a polymerization degree of PVA used in the linear polarizer may be, generally, approximately 1,000 to 10,000, or 1,500 to 5,000.

In the polarizing plate, the linear polarizer and the optical film may be attached to each other by, for example, a suitable known pressure-sensitive adhesive layer or adhesive layer in the art. In the polarizing plate, the optical film and the linear polarizer may be directly attached to each other by the adhesive layer or pressure-sensitive adhesive layer, or when needed, may be attached by further including a primer layer in-between an adhesive layer of a linear polarizer or in-between an adhesive layer of the optical film.

A method of attaching the optical film and the linear polarizer is not particularly limited. For example, a method which comprises coating an adhesive or pressure-sensitive adhesive composition on one surface of the linear polarizer or optical film, laminating the linear polarizer with the optical film, and curing the adhesive composition, or a method which comprises laminating the linear polarizer and optical film by dropping the adhesive or pressure-sensitive adhesive composition and curing the composition may be used. Here, the curing of the composition may be performed by applying a suitable active energy beam with a suitable intensity in consideration of components included in the composition.

The adhesive layer may have a glass transition temperature of, for example, 36, 37, 38, 39, 40, 50, 60, 70, 80, or 90° C. or more. When a stacked film and the linear polarizer are attached to each other with an adhesive layer having the glass transition temperature, a polarizing plate having excellent durability may be formed. The upper limit of the glass transition temperature of the adhesive layer is not particularly limited, but the glass transition temperature may be, for example, approximately 200, 150, or 120° C.

The adhesive layer may also have a thickness of 6, 5, or 4 μm or less. At this thickness, durability of the polarizing plate may be suitably maintained. The lower limit of the thickness of the adhesive layer is not particularly limited, but the thickness may be, for example, 0.1, 0.3, or 0.5 μm.

In one example, the adhesive layer may use an adhesive including a cation-curable adhesive composition including a cation-polymerizable compound such as an alicyclic and/or aliphatic epoxy compound as a main component, and when needed, an oxetane compound or silane compound having a cation-polymerizable functional group as a diluent or additive; a radical curable adhesive composition including a radical polymerizable compound such as the acryl amide-based compound as a main component, and when needed, another radical polymerizable compound as a subcomponent; or a hybrid curable adhesive composition including an epoxy resin, or a mixture of an alicyclic epoxy compound and an aliphatic epoxy compound, and a radical polymerizable compound in a cured state, but the present invention is not limited thereto. Components included in the adhesive composition and a ratio of each component may be suitably selected in consideration of the glass transition temperature.

In addition, the polarizing plate may further include a protective layer present on one surface of the linear polarizer, for example, on an opposite surface to the surface in contact with the optical film of the linear polarizer, or both surfaces of the linear polarizer.

Still another aspect of the present invention provides a display device. The exemplary display device may include the polarizing plate.

A specific kind of the display device including the polarizing plate is not particularly limited. The device may be, for example, an LCD such as reflective LCD or a semi-transparent reflective LCD, or an OLED.

In the display device, arrangement of the polarizing plate is not particularly limited, and for example, a known shape may be employed. For example, in a reflective LCD, the polarizing plate may be used as any one of polarizing plates of an LCD panel to prevent reflection of external light and ensure visibility. In addition, in an OLED, the polarizing plate may be disposed outside of an electrode layer of the OLED also to prevent reflection of external light and ensure visibility.

Advantage Effects

An exemplary optical film of the present invention can have a desired wavelength dispersion characteristic using the positive and negative uniaxial retardation films satisfying a predetermined condition. In addition, since the optical film has a desired wavelength dispersion characteristic, it can be utilized in various fields requiring delicate control of optical properties. For example, the optical film may be useful in the polarizing plate used to prevent reflection and ensure visibility in the display device.

DETAILED DESCRIPTION OF EXEMPLARY EMBODIMENTS

Hereinafter, an optical film will be described with reference to Examples in detail. However, the scope of the optical film is not limited to the following Examples.

Hereinafter, a retardation value and light leakage intensity in Examples and Comparative Examples were measured by the following method.

1. Measurement of in-Plane or Thickness-Direction Retardation Value

In-plane or thickness-direction retardation value of a retardation film, a stacked film, or an optical film was measured using an Axoscan tool (Axomatrics) capable of measuring 16 Muller matrixes. Particularly, 16 Muller matrixes were obtained according to the manual of the manufacturer using the Axoscan tool, and thereby a retardation value was extracted.

2. Measurement of Light Leakage Intensity

Light leakage intensity was evaluated by attaching an optical film of Example or Comparative Example on one surface of PVA (Poly vinyl alcohol) polarizer, measuring a reflectivity at a tilt angle of 50 degrees using a spectrometer (N&K), and measuring an intensity of light leaked from a PVA polarizer at every azimuthal angle. The light leakage intensity was defined with an arbitrary unit (AU) using the maximum brightness at every azimuthal angle as a control.

Example 1

An optical film of Example 1 was manufactured by stacking a positive uniaxial retardation film having an in-plane retardation value of 262.5 nm with respect to light with a wavelength of 450 nm, an in-plane retardation value of 250 nm with respect to light with a wavelength of 550 nm and an in-plane retardation value of 237.5 nm with respect to light with a wavelength of 650 nm, and a negative uniaxial retardation film having an in-plane retardation value of −120 nm with respect to light with a wavelength of 450 nm, an in-plane retardation value of −100 nm with respect to light with a wavelength of 550 nm, and an in-plane retardation value of −80 nm with respect to light with a wavelength of 650 nm for optical axes thereof to be arranged in parallel.

Figure 1:
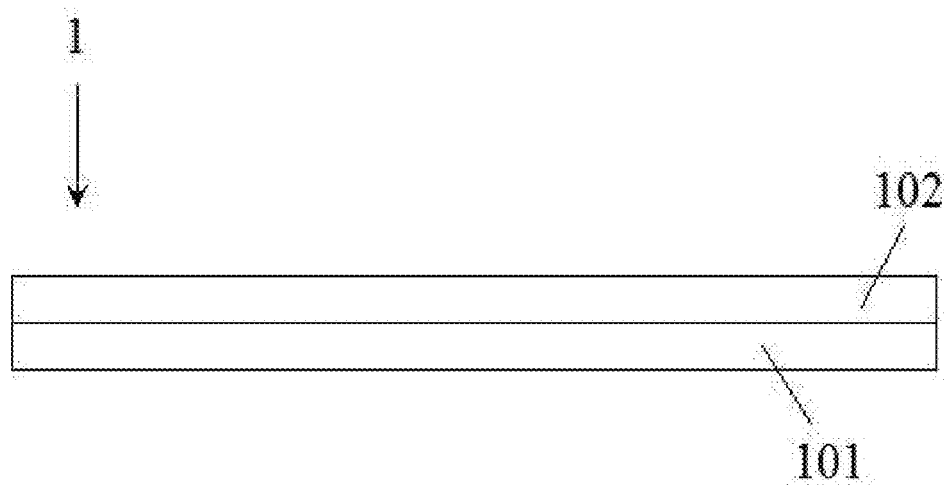
FIG. 1 is a schematic diagram of an exemplary optical film.
Figure 2:
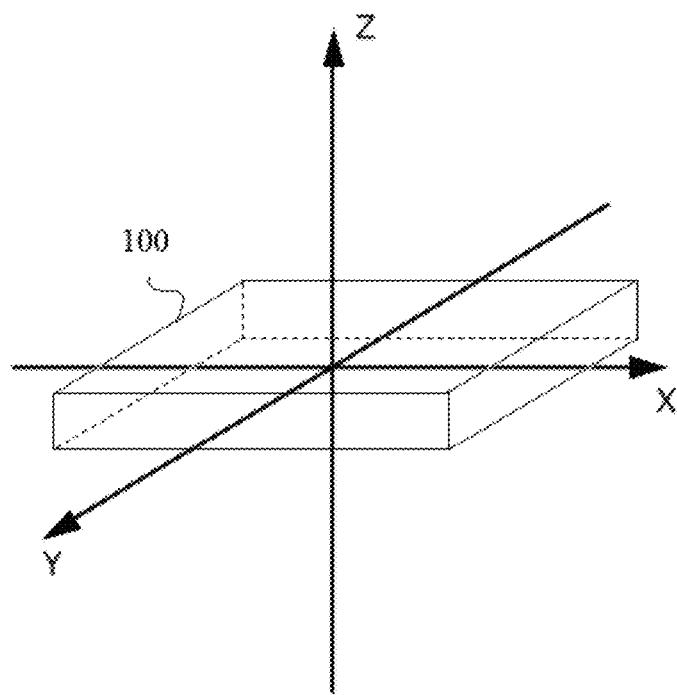
FIG. 2 is a diagram for describing x, y, and z axes of a retardation film.
Figure 3:
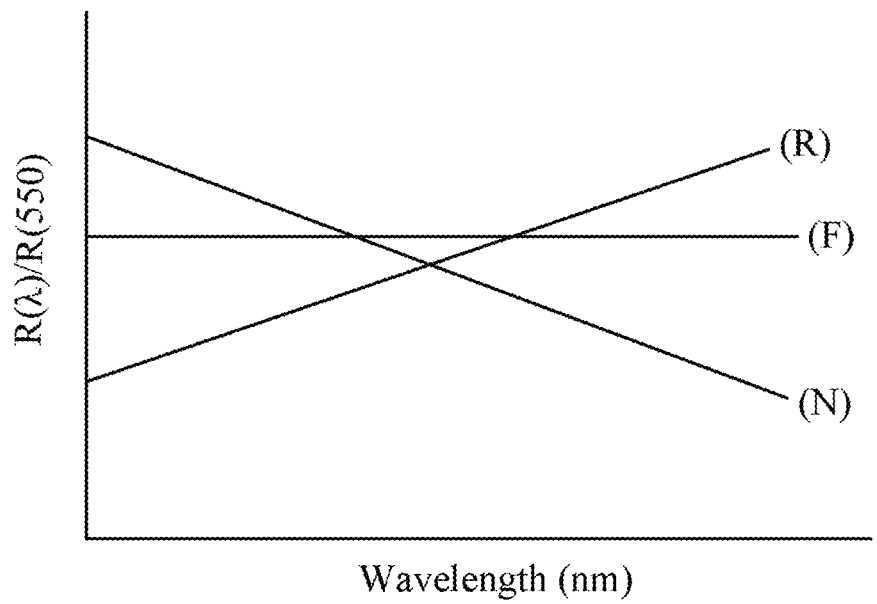
FIG. 3 is a graph for describing a wavelength dispersion characteristic of the retardation film.
Figure 4:
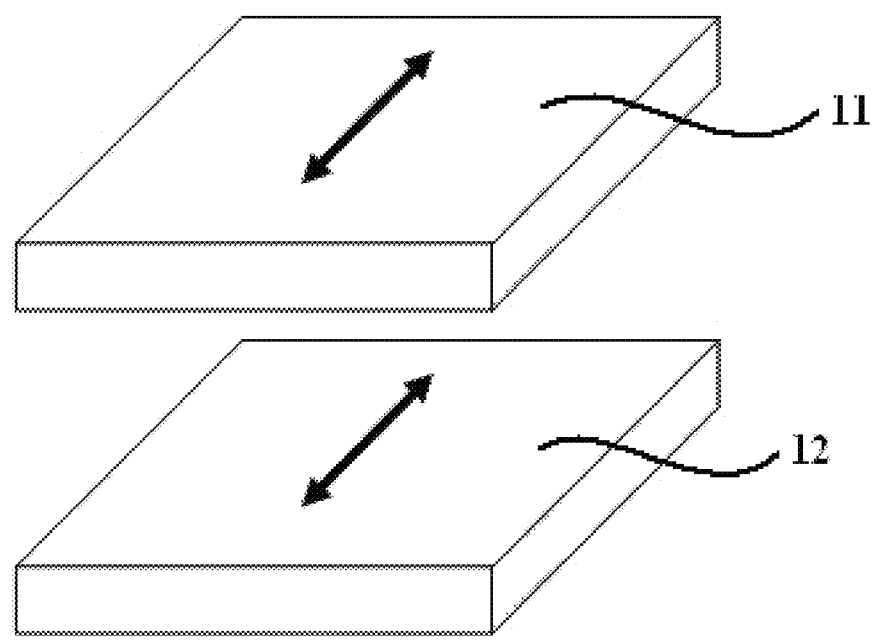
FIG. 4 is a diagram for describing an optical axis of the exemplary retardation film.
Figure 5:
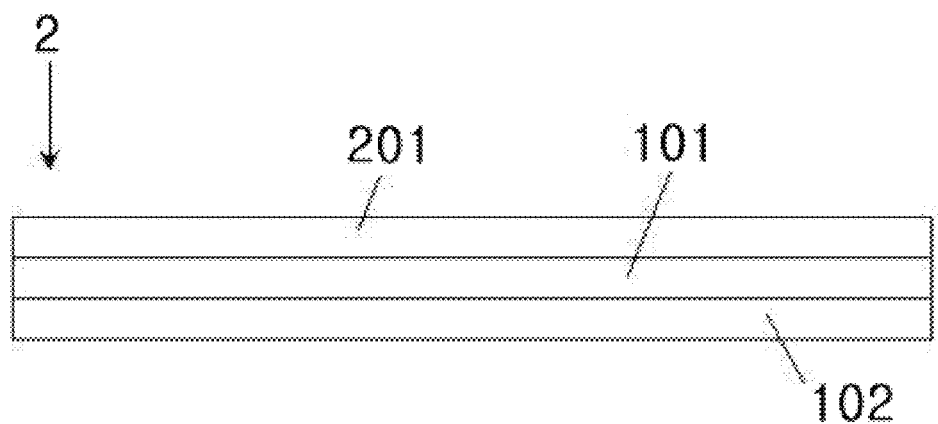
FIG. 5 is a schematic diagram of an exemplary polarizing plate.
Figure 6:
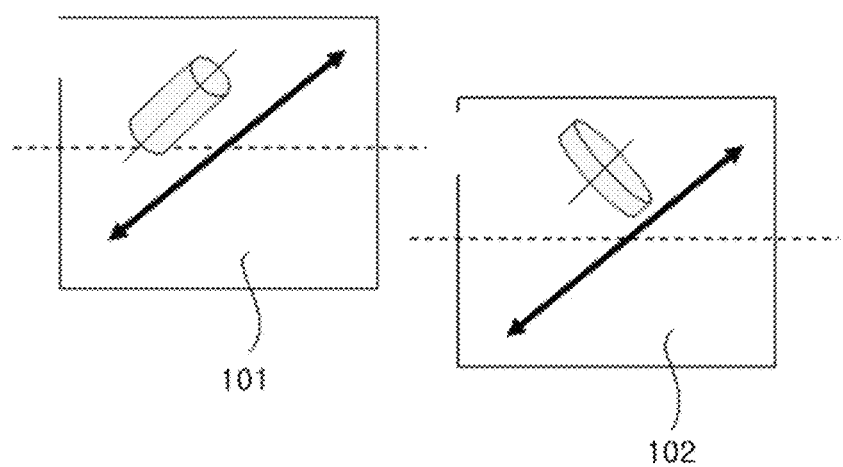
FIG. 6 is a diagram for describing the relationship between the optical axis of the exemplary retardation film and a light absorbing axis of a linear polarizer.
Figure 7:
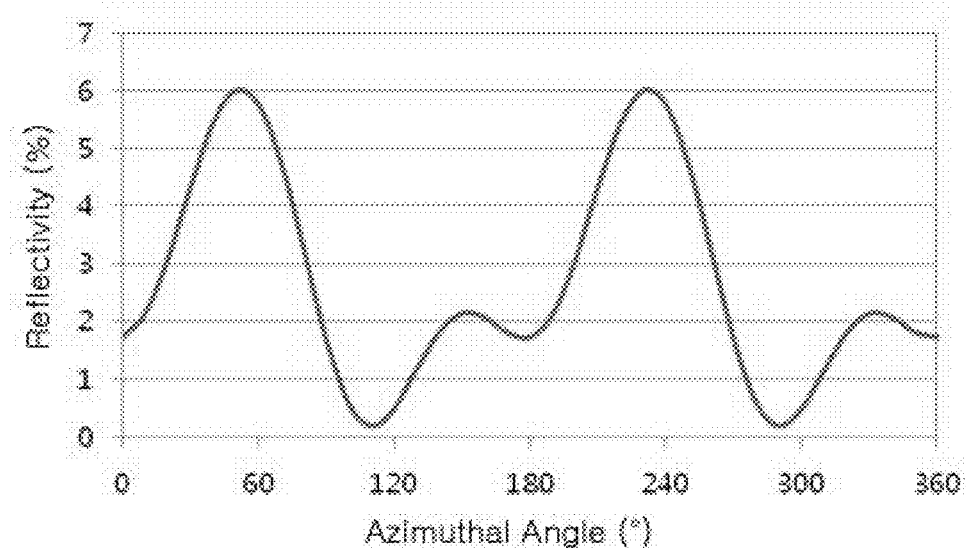
FIG. 7 shows light leakage intensity of an optical film of Example 1.

In addition, a polarizing plate was manufactured by attaching a positive uniaxial retardation film of the optical film to a PVA polarizer, and an intensity of light leaked from the PVA polarizer was measured at every azimuthal angle while irradiating light toward the optical film. In the manufacture of the polarizing plate, the polarizing plate was attached to the positive uniaxial retardation film so that a light absorbing axis of the PVA polarizer and a slow axis of the positive uniaxial retardation film form an angle of about 45 degrees counterclockwise when the optical film was observed on a side of the polarizer. Results of measuring the light leakage intensity of the optical film of Example 1 are shown in FIG. 7

Example 2

An optical film of Example 2 was manufactured by stacking a positive uniaxial retardation film having an in-plane retardation value of 125 nm with respect to light with a wavelength of 450 nm, an in-plane retardation value of 100 nm with respect to light with a wavelength of 550 nm and an in-plane retardation value of 75 nm with respect to light with a wavelength of 650 nm, and a negative uniaxial retardation film having an in-plane retardation value of −270 nm with respect to light with a wavelength of 450 nm, an in-plane retardation value of −250 nm with respect to light with a wavelength of 550 nm, and an in-plane retardation value of −230 nm with respect to light with a wavelength of 650 nm for optical axes thereof to be arranged in parallel.

Figure 8:
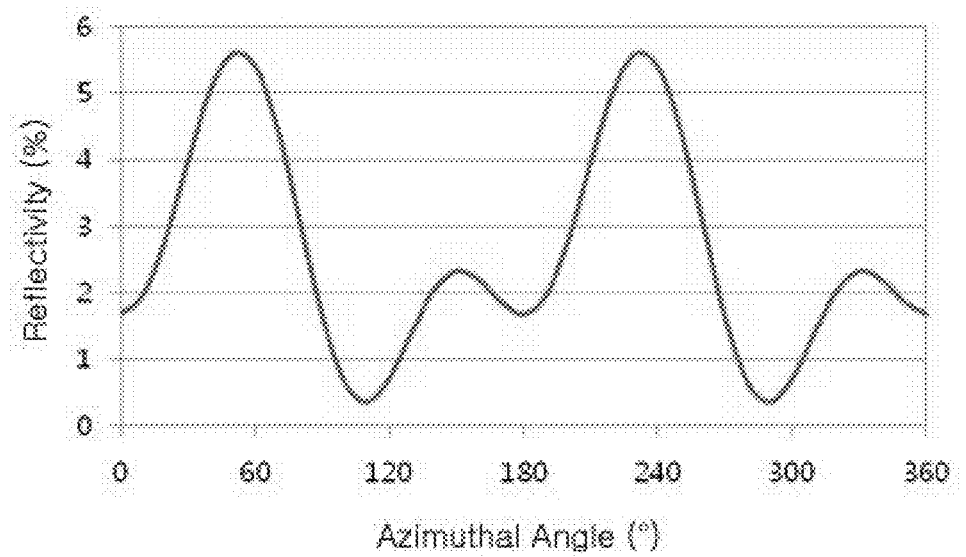
FIG. 8 shows light leakage intensity of an optical film of Example 2.

In addition, a polarizing plate was manufactured by attaching a positive uniaxial retardation film of the optical film to a PVA polarizer, and an intensity of light leaked from the PVA polarizer was measured at every azimuthal angle while irradiating light toward the optical film. In the manufacture of the polarizing plate, the polarizing plate was attached to the positive uniaxial retardation film so that a light absorbing axis of the PVA polarizer and a slow axis of the positive uniaxial retardation film form an angle of about 45 degrees counterclockwise when the optical film was observed on a side of the polarizer. Results of measuring the light leakage intensity of the optical film of Example 2 are shown in FIG. 8.

Comparative Example 1

An optical film of Comparative Example 1 was manufactured by stacking a positive uniaxial retardation film having an in-plane retardation value of 100 nm with respect to light with a wavelength of 550 nm, and a negative biaxial retardation film having an in-plane retardation value of 250 nm with respect to light with a wavelength of 550 nm and a thickness-direction retardation value of −60 nm with respect to light with a wavelength of 550 nm for optical axes thereof to be arranged in parallel.

Figure 9:
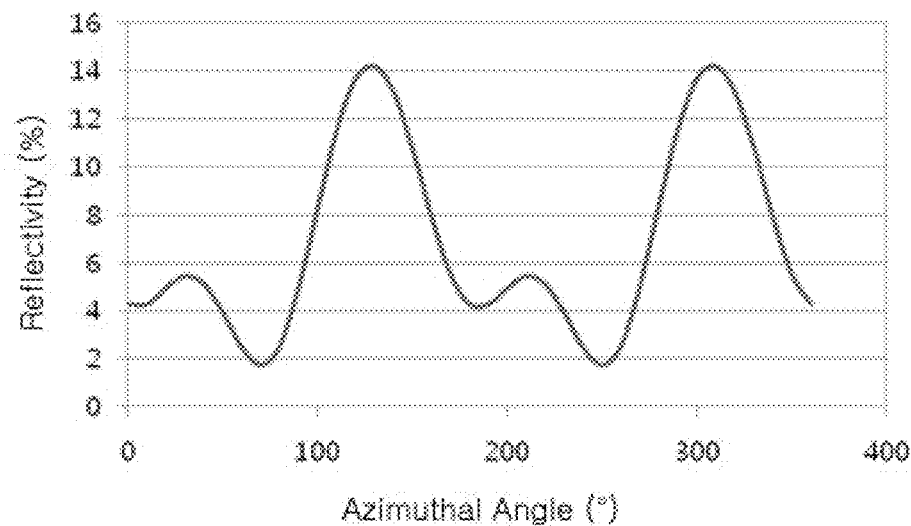
FIG. 9 shows light leakage intensity of an optical film of Comparative Example 1.

In addition, a polarizing plate was manufactured by attaching a positive uniaxial retardation film of the optical film to a PVA polarizer, and an intensity of light leaked from the PVA polarizer was measured at every azimuthal angle while irradiating light toward the optical film. In the manufacture of the polarizing plate, the polarizing plate was attached to the positive uniaxial retardation film so that a light absorbing axis of the PVA polarizer and a slow axis of the positive uniaxial retardation film form an angle of about 45 degrees counterclockwise when the optical film was observed on a side of the polarizer. Results of measuring the light leakage intensity of the optical film of Comparative Example 1 are shown in FIG. 9.

Comparative Example 2

An optical film of Comparative Example 2 was manufactured by stacking a negative biaxial retardation film having an in-plane retardation value 250 nm with respect to light with a wavelength of 550 nm and a thickness-direction retardation value of −60 nm with respect to light with a wavelength of 550 nm, and a negative biaxial retardation film having an in-plane retardation value of 250 nm with respect to light with a wavelength of 550 nm and a thickness-direction retardation value of −60 nm with respect to light with a wavelength of 550 nm for optical axes thereof to be arranged in parallel.

Figure 10:
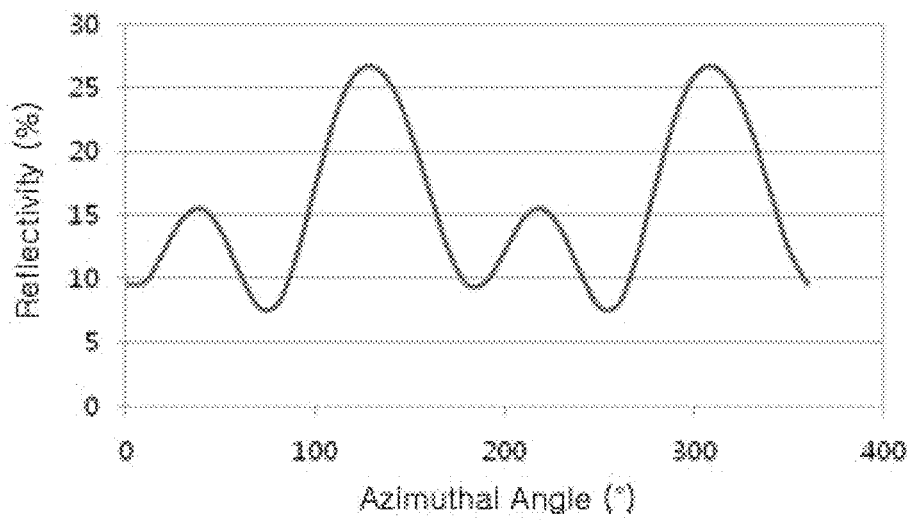
FIG. 10 shows light leakage intensity of an optical film of Comparative Example 2.

In addition, a polarizing plate was manufactured by attaching a positive uniaxial retardation film of the optical film to a PVA polarizer, and an intensity of light leaked from the PVA polarizer was measured at every azimuthal angle while irradiating light toward the optical film. In the manufacture of the polarizing plate, the polarizing plate was attached to the positive uniaxial retardation film so that a light absorbing axis of the PVA polarizer and a slow axis of the positive uniaxial retardation film form an angle of about 45 degrees counterclockwise when the optical film was observed on a side of the polarizer. Results of measuring the light leakage intensity of the optical film of Comparative Example 2 are shown in FIG. 10.

Comparative Example 3

An optical film of Comparative Example 3 was manufactured by stacking a positive uniaxial retardation film having an in-plane retardation value of 300 nm with respect to light with a wavelength of 450 nm, an in-plane retardation value of 250 nm with respect to light with a wavelength of 550 nm and an in-plane retardation value of 225 nm with respect to light with a wavelength of 650 nm, and a negative uniaxial retardation film having an in-plane retardation value of −120 nm with respect to light with a wavelength of 450 nm, an in-plane retardation value of −100 nm with respect to light with a wavelength of 550 nm, and an in-plane retardation value of −90 nm with respect to light with a wavelength of 650 nm for optical axes thereof to be arranged in parallel.

Figure 11:
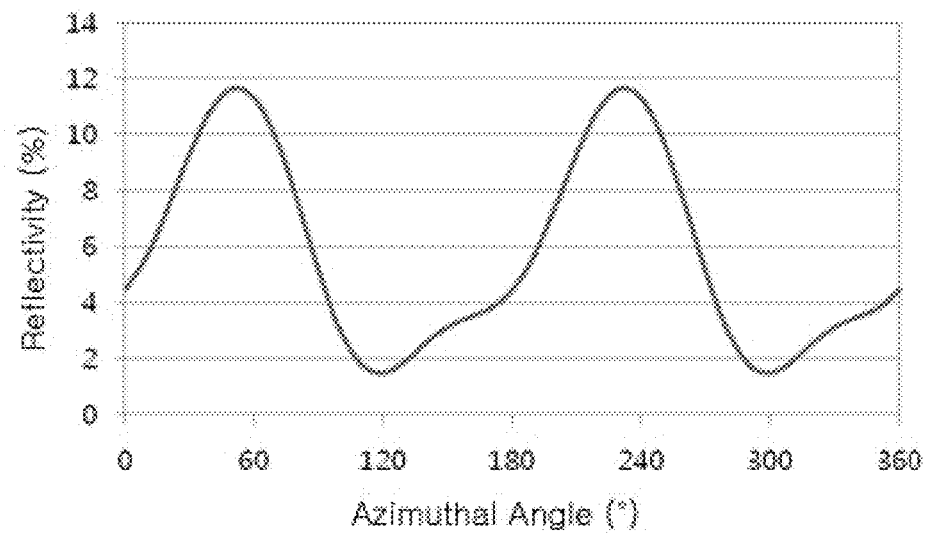
FIG. 11 shows light leakage intensity of an optical film of Comparative Example 3.

In addition, a polarizing plate was manufactured by attaching a positive uniaxial retardation film of the optical film to a PVA polarizer, and an intensity of light leaked from the PVA polarizer was measured at every azimuthal angle while irradiating light toward the optical film. In the manufacture of the polarizing plate, the polarizing plate was attached to the positive uniaxial retardation film so that a light absorbing axis of the PVA polarizer and a slow axis of the positive uniaxial retardation film form an angle of about 45 degrees counterclockwise when the optical film was observed on a side of the polarizer. Results of measuring the light leakage intensity of the optical film of Comparative Example 3 are shown in FIG. 11.

Comparative Example 4

An optical film of Comparative Example 4 was manufactured by stacking a positive uniaxial retardation film having an in-plane retardation value of 340 nm with respect to light with a wavelength of 450 nm, an in-plane retardation value of 250 nm with respect to light with a wavelength of 550 nm and an in-plane retardation value of 225 nm with respect to light with a wavelength of 650 nm, and a negative uniaxial retardation film having an in-plane retardation value of −120 nm with respect to light with a wavelength of 450 nm, an in-plane retardation value of −100 nm with respect to light with a wavelength of 550 nm, and an in-plane retardation value of −90 nm with respect to light with a wavelength of 650 nm for optical axes thereof to be arranged in parallel.

Figure 12:
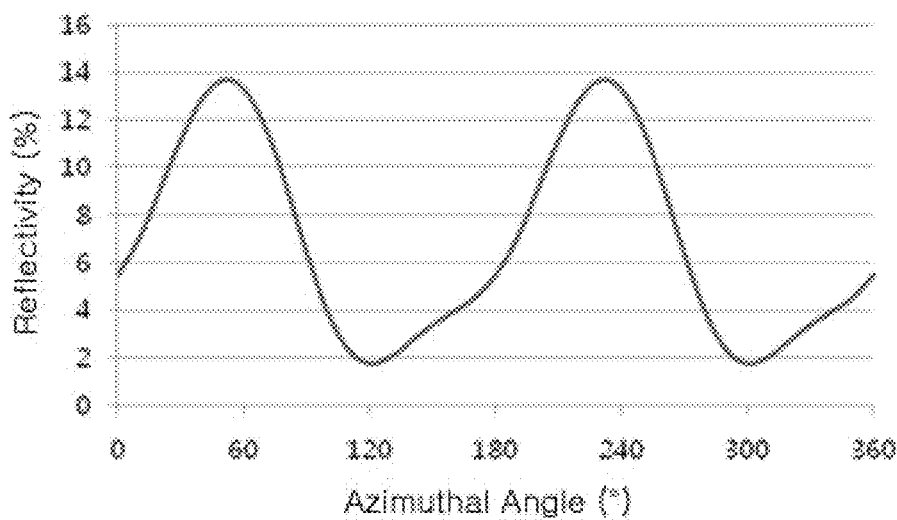
FIG. 12 shows light leakage intensity of an optical film of Comparative Example 4.

In addition, a polarizing plate was manufactured by attaching a positive uniaxial retardation film of the optical film to a PVA polarizer, and an intensity of light leaked from the PVA polarizer was measured at every azimuthal angle while irradiating light toward the optical film. In the manufacture of the polarizing plate, the polarizing plate was attached to the positive uniaxial retardation film so that a light absorbing axis of the PVA polarizer and a slow axis of the positive uniaxial retardation film form an angle of about 45 degrees counterclockwise when the optical film was observed on a side of the polarizer. Results of measuring the light leakage intensity of the optical film of Comparative Example 4 are shown in FIG. 12.

EXPLANATION OF MARKS

1: Optical Film
101: Positive Uniaxial Retardation Film
102: Negative Uniaxial Retardation Film
100: Retardation Film
2: Polarizer Plate
201: Linear Polarizer

What is claimed is:

1. A polarizing plate, comprising:
a linear polarizer; and
an optical film, comprising:
a positive uniaxial retardation film satisfying General Formula 1 and having a positive in-plane retardation value; and
a negative uniaxial retardation film satisfying General Formula 1 and having a negative in-plane retardation value, which are stacked,
wherein the positive uniaxial retardation film and the negative uniaxial retardation film are disposed to have an angle of −5 to 5 degrees between slow axis of each film,
wherein the light absorbing axis of the linear polarizer is disposed to have an angle of 40 to 50 degrees with the optical axis of the positive uniaxial retardation film,
wherein the value of an in-plane retardation is defined by General Formula 2, and
wherein the in-plane retardations of the uniaxial retardation films satisfy Formulas 1 to 3:

$n_x \neq n_y \approx n_z$      [General Formula 1]

$Rin = d \times (ne - no)$      [General Formula 2]

$|R_1(\lambda)| > |R_2(\lambda)|$      [Formula 1]

$R_1(450)/R_1(550) < R_2(450)/R_2(550)$      [Formula 2]

$|R(450)| < |R(650)|$      [Formula 3]

where in General Formula 1, $n_x$, $n_y$, and $n_z$ are refractive indexes of a retardation film in x, y, and z directions, respectively;
in General Formula 2, Rin is a value of in-plane retardation, d is a thickness of the retardation film, ne is an extraordinary refractive index, no is an ordinary refractive index, the extraordinary refractive index refers to a refractive index in an x axis direction, and the ordinary refractive index refers to a refractive index in a y direction;
in Formula 1, $|R_1(\lambda)|$ is an absolute value of an in-plane retardation of any one of the positive and negative uniaxial films with respect to light with a wavelength of λ nm, $|R_2(\lambda)|$ is an absolute value of an in-plane retardation of the other one of the positive and negative uniaxial films with respect to light with a wavelength of λ nm, and λ is a wavelength of 450, 550, or 650 nm;
in Formula 2, $R_1(450)$ and $R_1(550)$ are in-plane retardation values of one of the positive and negative uniaxial films, which has a higher absolute value of in-plane retardation, with respect to light with wavelengths of 450 and 550 nm, respectively, and $R_2(450)$ and $R_2(550)$ are in-plane retardation values of the other one of the positive and negative uniaxial films, which has a lower absolute value of in-plane retardation, with respect to light with wavelengths of 450 and 550 nm;
in Formula 3, $|R(450)|$ is an absolute value of the sum of $R_1(450)$ and $R_2(450)$, and $|R(650)|$ is an absolute value of the sum of $R_1(650)$ and $R_2(650)$.

2. The optical film according to claim 1, wherein the in-plane retardations of the uniaxial retardation films satisfy Formula 4:

$0.81 \leq R(450)/R(550) \leq 0.99$      [Formula 4]

where $R(450)$ is the sum of $R_1(450)$ and $R_2(450)$, and $R(550)$ is the sum of $R_1(550)$ and $R_2(550)$.

3. The optical film according to claim 1, wherein the in-plane retardations of the uniaxial retardation films satisfy Formula 5:

$1.01 \leq R(650)/R(550) \leq 1.19$      [Formula 5]

where $R(550)$ is the sum of $R_1(550)$ and $R_2(550)$, $R(650)$ is the sum of $R_1(650)$ and $R_2(650)$, the $R_1(650)$ is an in-plane retardation value of one of the positive and negative uniaxial films, which has a higher absolute value, with respect to light with a wavelength of 650 nm, and $R_2(650)$ is an in-plane retardation value of the other one of the positive and negative uniaxial films, which has a lower absolute value, with respect to light with a wavelength of 650 nm.

4. The optical film according to claim 1, wherein the positive uniaxial retardation film has a normal wavelength dispersion characteristic, and the negative uniaxial retardation film has a normal, flat, or reverse wavelength dispersion characteristic.

5. The optical film according to claim 1, wherein the positive uniaxial retardation film has a flat wavelength dispersion characteristic, and the negative uniaxial retardation film has a normal or reverse wavelength dispersion characteristic.

6. The optical film according to claim 1, wherein the positive uniaxial retardation film has a reverse wavelength dispersion characteristic, and the negative uniaxial retardation film has a normal, flat, or reverse wavelength dispersion characteristic.

7. The optical film according to claim 1, wherein the sum of $R_1(550)$ and $R_2(550)$ is in the range of 110 to 220 nm or in the range of −110 to −220 nm.

8. The optical film according to claim 1, wherein the positive uniaxial retardation film has an in-plane retardation in the range of 95 to 145 nm or in the range of 200 to 290 nm, with respect to light with a wavelength of 550 nm.

9. The optical film according to claim 1, wherein the negative uniaxial retardation film has an in-plane retardation in the range of −220 to −290 nm or in the range of −95 to −145 nm, with respect to light with a wavelength of 550 nm.

10. The optical film according to claim 1, wherein the positive uniaxial retardation film is a liquid crystal film including a stick-type liquid crystal compound or an optical anisotropic polymer film.

11. The optical film according to claim 1, wherein the negative uniaxial retardation film is a liquid crystal film including a discotic liquid crystal compound or a cholesteric liquid crystal compound or an optical anisotropic polymer film.

12. A display device comprising the polarizing plate of claim 1.

13. The display device according to claim 12, which is a reflective liquid crystal display, a semi-transparent reflective liquid crystal display, or an organic light emitting device.

* * * * *